US009729270B2

(12) United States Patent
Huang (10) Patent No.: US 9,729,270 B2
(45) Date of Patent: Aug. 8, 2017

(54) SELF-ADAPTIVELY IMPROVING SYSTEM STABILITY

(71) Applicant: Empire Technology Development LLC, Wilmington, DE (US)

(72) Inventor: Anpeng Huang, Beijing (CN)

(73) Assignee: EMPIRE TECHNOLOGY DEVELOPMENT LLC, Wilmington, DE (US)

(*) Notice: Subject to any disclaimer, the term of this patent is extended or adjusted under 35 U.S.C. 154(b) by 147 days.

(21) Appl. No.: 14/239,642

(22) PCT Filed: Mar. 12, 2013

(86) PCT No.: PCT/CN2013/072470
§ 371 (c)(1),
(2) Date: Feb. 19, 2014

(87) PCT Pub. No.: WO2014/139089
PCT Pub. Date: Sep. 18, 2014

(65) Prior Publication Data
US 2015/0029952 A1    Jan. 29, 2015

(51) Int. Cl.
*H04L 1/00* (2006.01)
*H04L 1/18* (2006.01)

(52) U.S. Cl.
CPC .......... *H04L 1/0003* (2013.01); *H04L 1/0009* (2013.01); *H04L 1/1812* (2013.01); *H04L 1/1819* (2013.01)

(58) Field of Classification Search
None
See application file for complete search history.

(56) References Cited

U.S. PATENT DOCUMENTS

| | | | | |
|---|---|---|---|---|
| 2004/0022177 A1* | 2/2004 | Awad et al. | ................... | 370/204 |
| 2005/0025254 A1* | 2/2005 | Awad | ................... | H04L 1/0003 375/295 |
| 2008/0081635 A1* | 4/2008 | Jonsson | ................... | 455/452.2 |
| 2008/0232301 A1* | 9/2008 | Cai et al. | ................... | 370/328 |
| 2009/0304117 A1* | 12/2009 | Koslov | ................... | H04L 1/0052 375/340 |
| 2010/0080176 A1* | 4/2010 | Maas et al. | ................... | 370/329 |
| 2011/0080873 A1* | 4/2011 | Zhang et al. | ................... | 370/328 |

(Continued)

FOREIGN PATENT DOCUMENTS

| | | |
|---|---|---|
| CN | 102611666 A | 7/2012 |
| CN | 102724016 A | 10/2012 |

(Continued)

OTHER PUBLICATIONS

Hong, W., et al., "A Cross-Layer Design Combining Method of AMC with HARQ Based on LDPC Codes," International Conference on Communications, Circuits and Systems, pp. 355-359, IEEE (2008).

(Continued)

*Primary Examiner* — Shaq Taha
*Assistant Examiner* — Ronald h Davis
(74) *Attorney, Agent, or Firm* — Brundidge & Stanger, P.C.

(57) ABSTRACT

In a wireless communication system, a base station may adopt AMC and HARQ mechanisms to improve the system stability and may further be configured to combine the feedback features of AMC and HARQ to save computing resources.

15 Claims, 5 Drawing Sheets

(56) References Cited

U.S. PATENT DOCUMENTS

2011/0164545 A1 7/2011 Koo et al.
2015/0003372 A1* 1/2015 Raaf et al. .................... 370/329

FOREIGN PATENT DOCUMENTS

| EP | 1289181 A1 | 3/2003 |
| EP | 1973225 A1 | 9/2008 |
| EP | 1973255 A1 | 9/2008 |
| EP | 1986365 A1 | 10/2008 |
| KR | 20040050756 A | 6/2004 |

OTHER PUBLICATIONS

Kwak, J., "Physical Layer ARQ: Discussion Items," Nov. 12, 2001, pp. 1-28.
International Search Report with Written Opinion for International Application No. PCT/CN2013/072470 mailed on Dec. 19, 2013.

* cited by examiner

SELF-ADAPTIVELY IMPROVING SYSTEM STABILITY

CROSS-REFERENCE TO RELATED APPLICATION

This application is a U.S. National Stage filing under 35 U.S.C. §371 of International Application No. PCT/CN2013/072470, filed on Mar. 12, 2013.

TECHNICAL FIELD

Technologies described herein pertain generally to self-adaptively improving system stability of a wireless communication system.

BACKGROUND

Unless otherwise indicated herein, the approaches described in this section are not prior art to the claims in this application and are not admitted to be prior art by inclusion in this section.

A Long Term Evolution (LTE) system may adopt Adaptive Modulation and Coding (AMC) and/or Hybrid Automatic Repeat Request (HARQ) to improve the system stability and reliability, and both AMC and HARQ may have independent feedback control mechanisms.

SUMMARY

Technologies are generally described for self-adaptively improving system stability of a wireless communication system. The various techniques may be implemented in various devices, methods and/or systems.

In some examples, methods may include transmitting data wirelessly, and implementing link adaption in subsequent wireless data transmission by using a combination of features from a HARQ procedure and an AMC technique.

In some examples, methods may include transmitting data wirelessly using a HARQ procedure by which one or more acknowledgement (ACK) messages and/or one or more negative-acknowledgement (NACK) messages are received by a transmitter from a receiver in accordance with the HARQ procedure with respect to the transmitted data, monitoring a number of ACK messages or a number of NACK messages received by the transmitter from the receiver during each of a plurality of equal periods of time, and adjusting a modulation and coding scheme (MCS) used in wireless data transmission based on changes in the number of ACK messages or the number of NACK messages received from one period of time to a next period of time.

In some other examples, computer readable mediums may store instructions that, when executed, may cause one or more processors to perform operations that include: transmitting data wirelessly using a HARQ procedure in which one or more ACK messages and/or one or more NACK messages are received by a transmitter from a receiver in accordance with the HARQ procedure with respect to the transmitted data, determining a number of ACK messages and a number of NACK messages received during a predefined period of time, and adjusting an MCS used in data transmission based on the number of ACK messages or the number of NACK messages received during the predefined period of time.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

Figure 1:
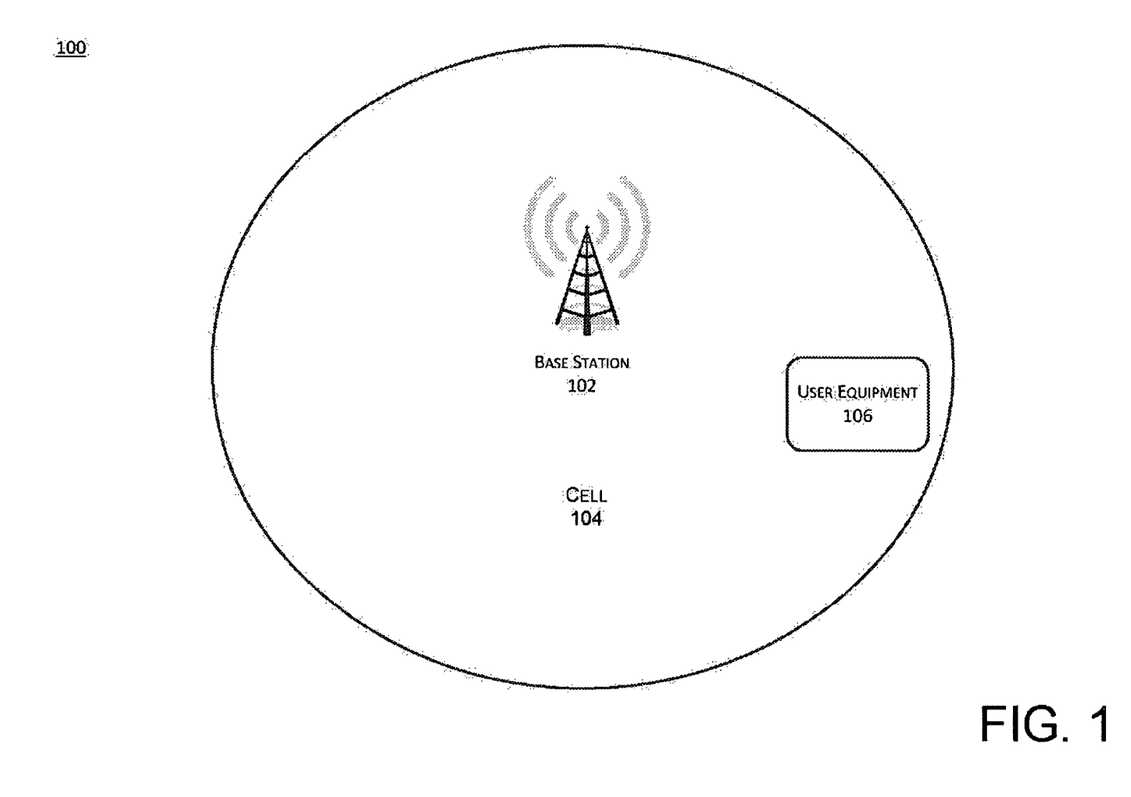
FIG. 1 shows an example configuration of a wireless communication system in which one or more embodiments of self-adaptively improving system stability may be implemented.

FIG. 1 shows an example configuration of a wireless communication system 100 in which one or more embodiments of self-adaptively improving system stability may be implemented. As depicted, wireless communication system 100 may include, at least, a base station 102, a cell 104, and a user equipment (UE) 106.

Base station 102 may be installed at a fixed location or may be implemented as a mobile base within the boundaries of cell 104. Further, base station 102 may transmit wireless signals to and from UE 106 when base station 102 is located within the boundaries of cell 104. Base station 102 may be configured to support wireless communication between one or more embodiments of UE 106 located within a corresponding cell. Such communication may be in accordance with different wireless communication standards including Time Division Duplex Long Term Evolution (TDD-LTE), Frequency Division Duplexing (FDD-LTE), IEEE 802.15.4, Global System for Mobile Communications (GSM), General Packet Radio Service (GPRS), Code Division Multiple Access (CDMA), 3rd generation of mobile telecommunications technology (3G), etc., which may further determine the work mode of user equipment 106. The work modes may include TDD mode and FDD mode. Such examples are not intended to be limiting, and therefore should not be interpreted to be so. Further, in an LTE system, base station 102 may be referred as an evolved Node B (eNB).

In accordance with at least some example embodiments, base station 102 may adopt mechanisms including AMC and/or HARQ in communication with UE 106. Such mechanisms may improve the system reliability without increasing the transmission power of base station 102. Each of AMC and HARQ has independent feedback mechanism utilized in determining channel quality of the wireless communication. That is, base station 102 adopting AMC may select a corresponding Modulation and Coding Scheme (MCS) level in response to Channel Quality Index (CQI) from UE 106 as feedback. CQI may be indicative of channel quality of a wireless communication while the MCS level may further determine some transmission parameters of the wireless communication. Base station 102, adopting HARQ, may retransmit information one or more times in response to a Non-acknowledge (NACK) signal from UE 106. Both feedback mechanisms may cost computing resources including CPU time, Random Access Memory (RAM), hard disk space, network throughput, and/or electrical power. Therefore, combining AMC and HARQ and sharing the feedback mechanisms may save some computing resources in determining the channel quality while improving system stability.

Cell 104 may refer to a range of radio coverage in a respective cellular network, which may be configured to provide wireless communication for user equipment 106 therein, and may further be equipped with base station 102.

UE 106 may refer to a mobile (or portable) electronic device such as a mobile phone, smartphone, personal digital assistant (PDA) a personal media player device, an application specific device, or a hybrid device that includes any of the above functions. Alternatively, UE 106 may be implemented as a personal computer including tablet, laptop computer, non-laptop computer configurations, etc.

Thus, FIG. 1 shows an example configuration of a wireless communication system 100 in which one or more embodiments of self-adaptively improving system stability may be implemented.

Figure 2:
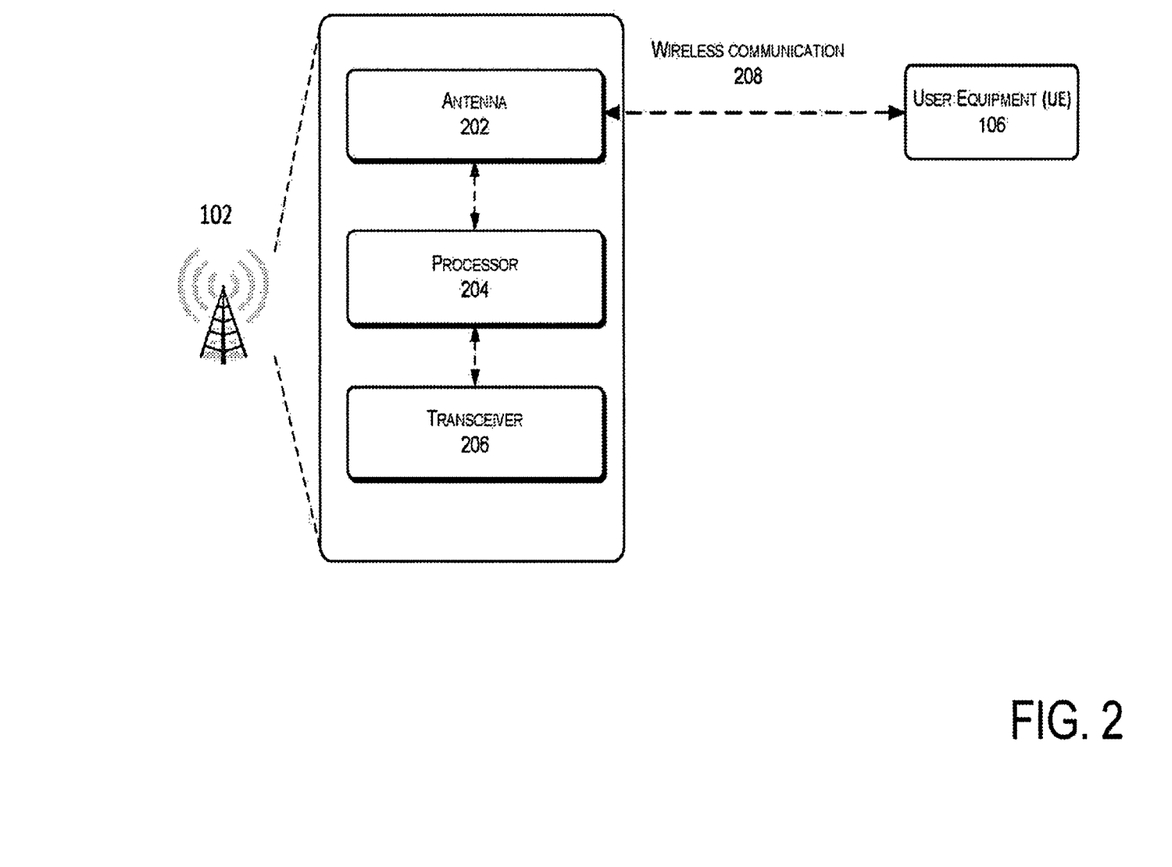
FIG. 2 shows an example base station by which one or more embodiments of self-adaptively improving system stability may be implemented.

FIG. 2 shows an example base station 102 by which one or more embodiments of self-adaptively improving system stability may be implemented. As depicted, base station 102 may include an antenna 202, a processor 204, and a transceiver 206.

Antenna 202 may refer to a component or module, implemented as software, hardware, firmware, or any combination thereof, that may be configured to convert electric power into electromagnetic waves, and vice versa, and then to transmit signals to UE 106 via wireless communication 208. Antenna 202 may be configured to radiate energy from an oscillating radio frequency electric current as electromagnetic waves when transmitting radio signals. Antenna 202 may be configured to intercept some of the power of electromagnetic waves to produce a relatively lower voltage at its terminals, at which the intercepted power may be further amplified, when receiving radio signals from a communication device within a respective cell or from another base station corresponding to a different cell.

Processor 204 may refer to a component or module that may be configured to synchronize signals received, via antenna 202, from UE 106 and one or more embodiments of UE 106 in cell 104.

In accordance with at least some examples, processor 204 may be configured to adopt AMC to manage wireless communication 208 between antenna 202 and UE 106 and may further determine the MCS level according to a feedback CQI, which indicates the channel quality, from UE 106. In some examples, the MCS level may further determine, according to the MCS table in 802.11n protocol, a modulation type (e.g., BPSK, QPSK, 16-QAM, or 64-QAM), a data rate, and a coding rate of a transmission of wireless communication 208 between antenna 202 and UE 106. When the channel quality changes, UE 106 may update the CQI; and base station 102, according to AMC, may modify the MCS level in response to the CQI update.

In accordance with at least some other examples, processor 204 may adopt HARQ that embeds Forward Error Correction (FEC) in Automatic Repeat Request (ARQ) to reduce retransmission times. In accordance with a communication implementing HARQ, UE 106 may transmit an ACK signal to antenna 202, via wireless communication 208, after UE 106 correctly decodes signals, or detects no data errors. UE 106 may submit a NACK signal to antenna 202 to request that processor 204 retransmit the signals if UE 106 does not correctly decode signals or detects a data error. Since data errors may occur in retransmitting the signals, UE 106 may submit the NACK signal more than once.

Processor 204 may determine the MCS level to implement link adaptation in wireless data transmissions by using a combination of features from a HARQ procedure and the AMC technique. The determining may be based on the number of NACK signals or the retransmission times within a predefined period since either may indicate the channel quality of a wireless communication, just as CQI does. That is, in a wireless communication of low channel quality, data errors may occur more frequently than in a wireless communication via an ideal lossless channel. Therefore, in a wireless communication characterized by low channel quality, UE 106 may transmit more NACK signals and base station 102 may retransmit signals more often than in a wireless communication characterized by a lossless channel. Additionally, processor 204 may determine the MCS level according to the number of ACK signals since the number of ACK signals within the predefined period of time may also indicate the channel quality of a wireless communication. Accordingly, some computing resources may be conserved or saved since UE 106 may no longer need to monitor and submit the CQI to processor 204 and processor 204 may no longer need to analyze the CQI.

Transceiver 206 may refer to a component or module that may be configured to transform digital or analog signals into a radio frequency electric current, during transmission thereof. Transceiver 206 may be configured to transform the low voltage on terminals of antenna 202 into digital or analog signals when signals are received at base station 102.

Thus, FIG. 2 shows an example base station 102 by which one or more embodiments of self-adaptively improving system stability may be implemented.

Figure 3:
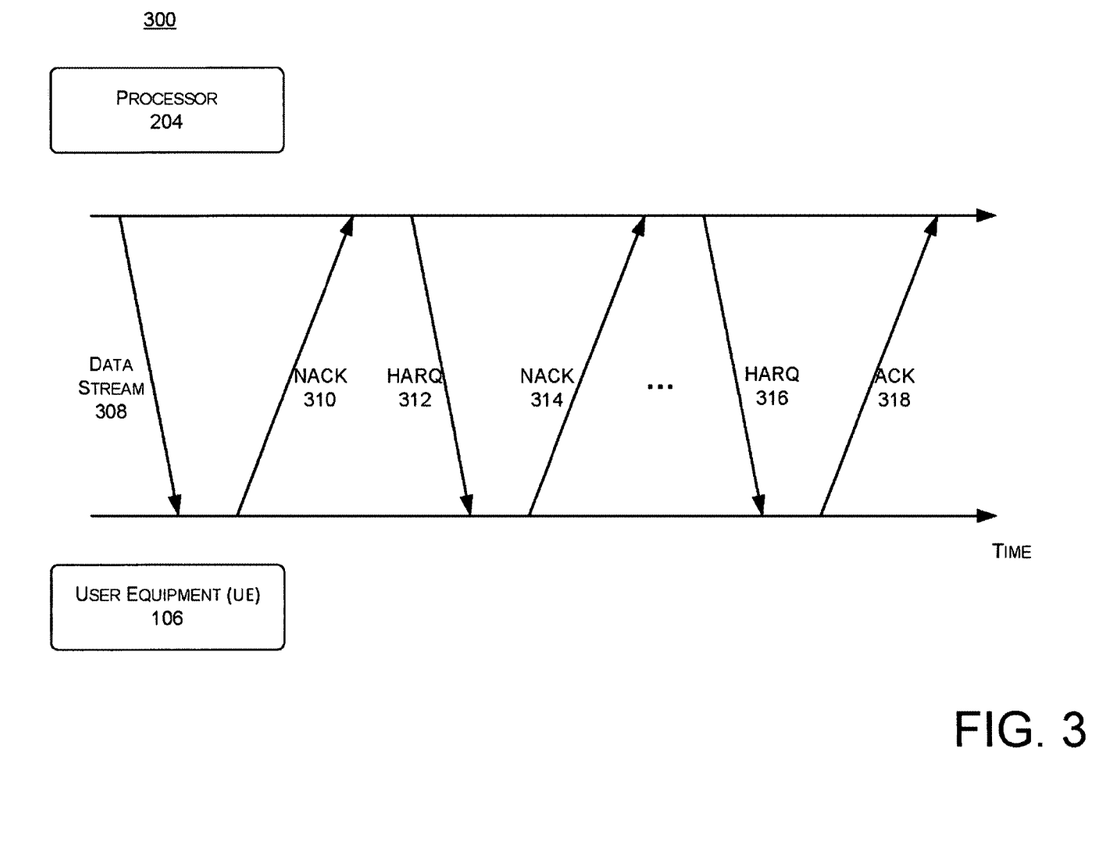
FIG. 3 shows an example improving process by which one or more embodiments of self-adaptively improving system stability may be implemented.

FIG. 3 shows an example retransmission process 300 by which one or more embodiments of self-adaptively improving system stability may be implemented. As depicted, retransmission process 300 may include, at least, a data stream 308, a NACK 310, a HARQ 312, a NACK 314, a HARQ 316, and an ACK 318.

Data stream 308 may refer to signals carrying information transmitted from processor 204 to UE 106. Such signals may include commands, instructions, and/or other forms of data.

NACK 310 may refer to a signal that indicates that UE 106 did not correctly decode data stream 308 or that data errors occurred in data stream 308. NACK 314 may refer to a NACK signal submitted by UE 106 after NACK 310 when UE 106 is unable to decode a first retransmission of data stream 308. In response to NACK 310, processor 204 may retransmit data stream 308 in the form of HARQ 312. Similarly, processor 204 may retransmit data stream 308 in the form of HARQ in response to NACK 314 or other NACK signals after NACK 310 in the form of HARQ 316. Since a data error may occur during transmission of HARQ 312, HARQ 316, etc., retransmission of data stream 308 may occur more than once. For example, in a deteriorated communication channel (e.g., UE 106 moved to a location farther to base station 102 than a previous one), the retransmission times may be indicative of the channel quality since processor 204 may retransmit data stream 308 more frequently as channel quality deteriorates. In an improved communication channel (e.g., UE 106 moved to a location closer to base station 102 than a previous one), the number of ACK signals within the predefined period may be indicative of the channel quality as well. Thus, monitoring the retransmission times and/or the number of ACK signals as substitutes for monitoring CQI in AMC may save some computing resources since both AMC and HARQ mechanisms may be sharing the same feedback information.

ACK 318 may refer to a signal that notifies processor 204 that UE 106 correctly decoded data stream 308.

Thus, FIG. 3 shows an example retransmission process 300 by which one or more embodiments of self-adaptively improving system stability may be implemented.

Figure 4:
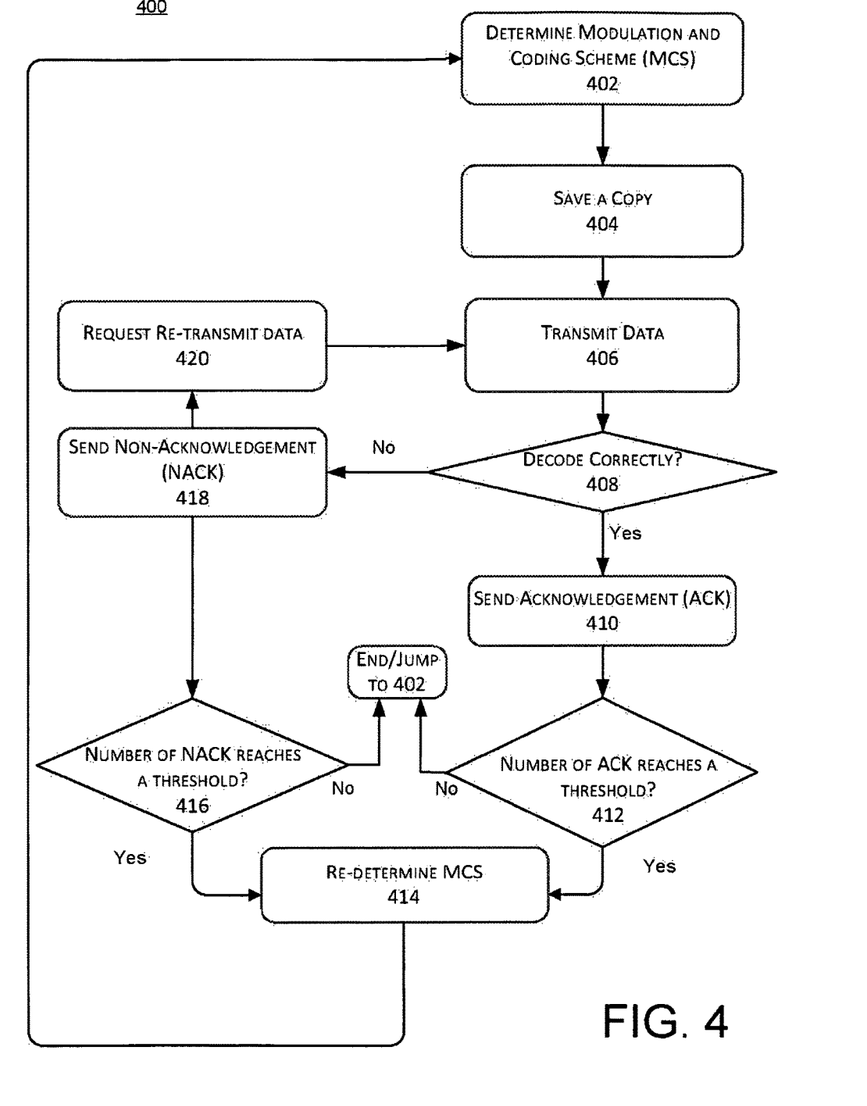
FIG. 4 shows an example configuration of a processing flow of operations by which embodiments of self-adaptively improving system stability may be implemented.

FIG. 4 shows an example configuration of a processing flow 400 of operations by which embodiments of self-adaptively improving system stability may be implemented. As depicted, processing flow 400 may include sub-processes executed by various components that are part of wireless communication system 100. However, processing flow 400 is not limited to such components, as obvious modification may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 402, 404, 406, 408, 410, 412, 414, 416, 418, and/or 420. Processing may begin at block 402.

Block 402 (Determine Modulation and Coding Scheme (MCS)) may refer to processor 204 selecting an MCS level to further determine system parameters of the corresponding wireless communication including a modulation type (e.g., BPSK, QPSK, 16-QAM, or 64-QAM), a data rate, and a coding rate. Processor 204, via antenna 202, may wirelessly transmit data according to the determined parameters. Processing may proceed from block 402 to block 404.

Block 404 (Save a Copy) may refer to processor 204 saving a copy of the content of data stream 308 on system memory associated with processor 204. Processor 204 may be configured to preset the number of retransmission times as zero and to track the number of retransmission times. Processing may proceed from block 404 to block 406.

Block 406 (Transmit Data) may refer to processor 204 transmitting data stream 308, via a physical layer that includes antenna 202. Additionally, in accordance with at least some examples, processor 204 may pack redundant data together with data stream 308 into a frame for the purpose of FEC. The redundant data may include substantially the same information as data stream 308 so that, in some cases, UE 106 may retrieve correct data from the redundant data when UE 106 is unable to correctly decode data stream 308. The frame may further include extra data for error detection. Extra data for error detection schemes may further include repetition codes, parity bits, checksums, cyclic redundancy checks (CRCs), and/or cryptographic hash functions. Processing may proceed from block 406 to decision block 408.

Decision block 408 (Decoded Correctly?) may refer to UE 106 deciding whether UE 106 correctly decoded data stream 308 (i.e., whether errors occurred during transmission of data stream 308). The decision may be made based on the result of error detection according to the extra data. Processing may proceed from block 408 to block 410 ("yes") if UE 106 can correctly decode data stream 308. Processing may proceed from block 408 to block 418 ("no") if UE 106 is unable to correctly decode data stream 308.

Block 410 (Send Acknowledgement (ACK)) may refer to UE 106 sending processor 204 an ACK signal that indicates that UE 106 can correctly decode data stream 308. Processor 204 may be configured to track the number of ACK signals within each one of predefined periods. Processor 204 may start transmitting a new data stream. Processing may proceed from block 410 to decision block 412.

Decision block 412 (Number of ACK Reaches a Threshold?) may refer to processor 204 determining whether the number of ACK signals within a predefined period reaches a preset threshold. The preset threshold may refer to a fixed number preset by processor 204 before transmitting data stream 308. Alternatively, the preset threshold may refer to the number of ACK signals within a previous predefined period of time. Processor 204 may be configured to maintain a plurality of preset threshold, each of which may correspond to a certain MCS level. Processing may proceed from decision block 412 to block 414 if the number of ACK signals reaches one of the preset thresholds. Alternatively, if "no," processing may revert to block 402 when the preset threshold is not reached.

Block 418 (Send Non-acknowledgement (NACK)) may refer to UE 106 sending processor 204 a NACK signal that indicates that UE 106 is unable to correctly decode data stream 308. Processor 204 may be configured to track the number of NACK signals within a predefined period. Processing may proceed from block 418 to block 420 and to block 416.

Block 420 (Request Re-transmit Data) may refer to UE 106 requesting processor 204 to re-transmit data stream 308. Processor 204 may determine whether the number of retransmission times has reached a preset maximum number. If the preset maximum number has been reached, processor 204 may terminate the transmission of data stream 308 regardless of the failure of decoding data stream 308. If the number of retransmission is still less than the preset maximum number, processor 204 may retrieve the saved copy of data stream 308, re-transmit such copy via antenna 202, and add one to the number of retransmissions. Processing may revert from block 420 to block 406.

Decision block 416 (Number of NACK Reaches a Threshold?) may refer to processor 204 determining whether the number of NACK signals within a predefined period reaches a preset threshold. Similar to decision block 412, the preset threshold may refer to a fixed number preset by processor 204 before transmitting data stream 308 or the preset threshold may refer to the number of NACK signals within a previous predefined period. However, the fixed number may not be the same as in block 412. Processor 204 may be configured to maintain a plurality of preset thresholds, each of which may correspond to a certain MCS level. Processing may proceed from block 416 to block 414 if the number of NACK signals reaches one of the preset thresholds. Alternatively, if "no," processing may revert to block 402 when the preset threshold is not reached.

Block 414 (Re-determine MCS) may refer to processor 204 adjusting the MCS level based on the number to ACK signals and/or NACK signals. An improvement in channel quality may be determined or otherwise revealed by an increase in ACK signals or a decrease in NACK signals within a current predefined period of time, relative to a comparison of ACK signals or NACK signals in a previously predefined period of time. Similarly, a deterioration in channel quality may be determined or otherwise revealed by a decrease in ACK signals or an increase in NACK signals within a current predefined period of time, relative to a comparison of ACK signals or NACK signals in a previously predefined period of time. Processor 204 may be configured to adjust the MCS level accordingly.

In accordance with at least some examples, processor 204 may increase the MCS to a higher level in response to the number of ACK signals within the predefined period reaching the preset threshold. Alternatively, processor 204 may increase the MCS level in response to the number of NACK signals within the predefined period dropping below the preset threshold.

In other examples, processor 204 may decrease the MCS to a lower level in response to the number of NACK signals within the predefined period reaching the preset threshold. Alternatively, processor 204 may decrease the MCS level in response to the number of ACK signals within the predefined period dropping below the preset threshold. Processing may revert to block 402.

Thus, FIG. 4 shows an example configuration of a processing flow 400 of operations by which embodiments of self-adaptively improving system stability may be implemented.

Figure 5:
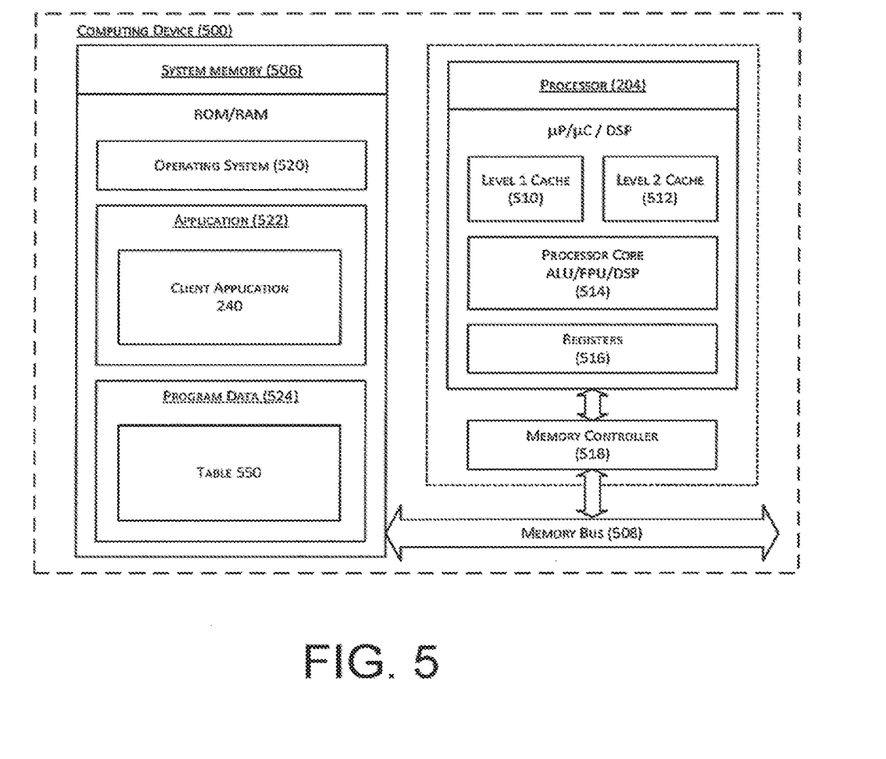
FIG. 5 shows a block diagram illustrating an example computing device that is arranged for self-adaptively improving system stability, all arranged in accordance with at least some embodiments described herein.

FIG. 5 shows a block diagram illustrating an example computing device 500 that is arranged for self-adaptively improving system stability.

More particularly, FIG. 5 shows an illustrative computing embodiment, in which any of the processes and sub-processes described herein may be implemented as computer-readable instructions stored on a computer-readable medium. The computer-readable instructions may, for example, be executed by a processor of a device, as referenced herein, having a network element and/or any other device corresponding thereto, particularly as applicable to the applications and/or programs described above corresponding to the example wireless communication system.

In a very basic configuration, a computing device 500 may typically include one or more processors 204 and a system memory 506. A memory bus 508 may be used for communicating between processor 204 and system memory 506.

Depending on the desired configuration, processor 204 may be of any type including but not limited to a microprocessor (μP), a microcontroller (μC), a digital signal processor (DSP), or any combination thereof. The processor 204 may include one or more levels of caching, such as a level one cache 510 and a level two cache 512, a processor core 514, and registers 516. An example processor core 514 may include an arithmetic logic unit (ALU), a floating point unit (FPU), a digital signal processing core (DSP core), or any combination thereof. An example memory controller 518 may also be used with the processor 204, or in some implementations, the memory controller 518 may be an internal part of the processor 204.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524.

Application 522 may be configured to self-adaptively improve system stability as described previously with respect to FIGS. 1-4. Program data 524 may include a table 550, which may be useful for implementing actuation of appropriate components or modules as described herein.

System memory 506 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for wireless communication system 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry, out the distribution. Examples of a signal bearing medium include, but are not limited to, the following: a recordable type medium such as a floppy disk, a hard disk drive (HDD), a compact disk (CD), a digital versatile disk (DVD), a digital tape, a computer memory, etc.; and a transmission type medium such as a digital and/or an analog communication medium (e.g., a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general, such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general, such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method, comprising:
   transmitting data wirelessly using a hybrid automatic repeat request (HARQ) procedure in which one or more acknowledgement (ACK) messages or one or more negative-acknowledgement (NACK) messages, or both, are received by a transmitter from a receiver in accordance with the HARQ procedure with respect to the wireless data transmission;
   monitoring a number of ACK messages or a number of NACK messages received by the transmitter from the receiver during each of a plurality of durations of a given length;
   determining a modulation and coding scheme (MCS) level used in the wireless data transmission based on at least one of the number of ACK messages and the number of NACK messages received during a first duration of the plurality of durations; and
   adjusting the MCS level based on a comparison of: the number of ACK messages or the number of NACK messages received during a second duration of the plurality of durations, with: the number of ACK messages or the number of NACK messages received during the first duration of the plurality of durations.

2. The method of claim 1, wherein the adjusting the MCS level comprises:
   increasing the MCS level to a higher level in response to an increase in the number of ACK messages received from the first duration to the second duration of the plurality of durations.

3. The method of claim 2, wherein the adjusting the MCS level comprises:
   decreasing the MCS level to a lower level in response to a decrease in the number of ACK messages received from the first duration to the second duration of the plurality of durations.

4. The method of claim 1, wherein the adjusting the MCS level comprises:
   decreasing the MCS level to a lower level in response to an increase in the number of NACK messages received from the first duration to the second duration of the plurality of durations.

5. The method of claim 4, wherein the adjusting the MCS level comprises:
   increasing the MCS level to a higher level in response to a decrease in the number of NACK messages received from the first duration to the second duration of the plurality of durations.

6. The method of claim 1, wherein the transmitting data wirelessly comprises transmitting the data in accordance with a long-term evolution (LTE) standard.

7. A non-transitory computer-readable medium that stores instructions that, in response to execution, cause one or more processors to perform or control performance of operations comprising:
   transmit data wirelessly using a hybrid automatic repeat request (HARQ) procedure in which one or more acknowledgement (ACK) messages or one or more negative-acknowledgement (NACK) messages, or both, are received by a transmitter from a receiver in accordance with the HARQ procedure with respect to the wireless data transmission;
   monitor a number of ACK messages and a number of NACK messages received during each of a plurality of durations of a given length;
   determine a modulation and coding scheme (MCS) level used in the wireless data transmission based on at least one of the number of ACK messages and the number of NACK messages received during a first duration of the plurality of durations;
   set one of the number of ACK messages and the number of NACK messages received during the first duration of the plurality of durations as a threshold value; and
   adjust the MCS level based on the number of ACK messages or the number of NACK messages received during a second duration of the plurality of durations and based on the threshold value, wherein the threshold value corresponds to the MCS level.

8. The non-transitory computer-readable medium of claim 7, wherein the adjustment of the MCS level comprises:
   increase the MCS level to a higher level in response to the number of ACK messages received during the second duration being greater than the number of ACK messages received during the first duration.

9. The non-transitory computer-readable medium of claim 7, wherein the adjustment of the MCS level comprises:
   decrease the MCS level to a lower level in response to the number of NACK messages received during the second duration being greater than the number of NACK messages received during the first duration.

10. The non-transitory computer-readable medium of claim 7, wherein the adjustment of the MCS level comprises:
    increase the MCS level to a higher level in response to the number of ACK messages received during the second duration being greater than a first ACK threshold value; and
    decrease the MCS level to a lower level in response to the number of ACK messages received during the second duration being less than a second ACK threshold value.

11. The non-transitory computer-readable medium of claim 7, wherein the adjustment of the MCS level comprises:
    increase the MCS level to a higher level in response to the number of NACK messages received during the second duration being less than a first NACK threshold value; and
    decrease the MCS level to a lower level in response to the number of NACK messages received during the second duration being greater than a second NACK threshold value.

12. The non-transitory computer-readable medium of claim 7, wherein the wireless data transmission comprises transmission of the data in accordance with a long term evolution (LTE) standard.

13. A base station, comprising:
    an antenna configured to transmit data wirelessly using a hybrid automatic repeat request (HARQ) procedure in which one or more acknowledgement (ACK) messages or one or more negative-acknowledgement (NACK) messages, or both, are received by the antenna from a user equipment in accordance with the HARQ procedure with respect to the wireless data transmission; and a processor communicatively coupled to the antenna, wherein the processor is configured to perform or control performance of:
    monitor a number of ACK messages received by the antenna during each of a plurality of durations of a given length;
    determine a modulation and coding scheme (MCS) level used in the wireless data transmission based on the number of ACK messages received during a first duration of the plurality of durations; and
    adjust the MCS level based on the number of ACK messages received during a second duration of the plurality of durations,
    wherein the adjustment of the MCS level comprises:
        increase the MCS level to a higher level in response to the number of ACK messages received during the second duration being greater than a first ACK threshold value, and
        decrease the MCS level to a lower level in response to the number of ACK messages received during the second duration being less than a second ACK threshold value.

14. The base station of claim 13, wherein at least one of the first ACK threshold value and the second ACK threshold value corresponds to the number of ACK messages received during the first duration of the plurality of durations.

15. The base station of claim 13, wherein at least one of the first ACK threshold value and the second ACK threshold value corresponds to a specific number determined by the processor.

* * * * *